Nov. 11, 1924.  
A. J. DRISCOLL ET AL  
WINDOW CLEANER  
Filed June 1, 1921  
1,515,015
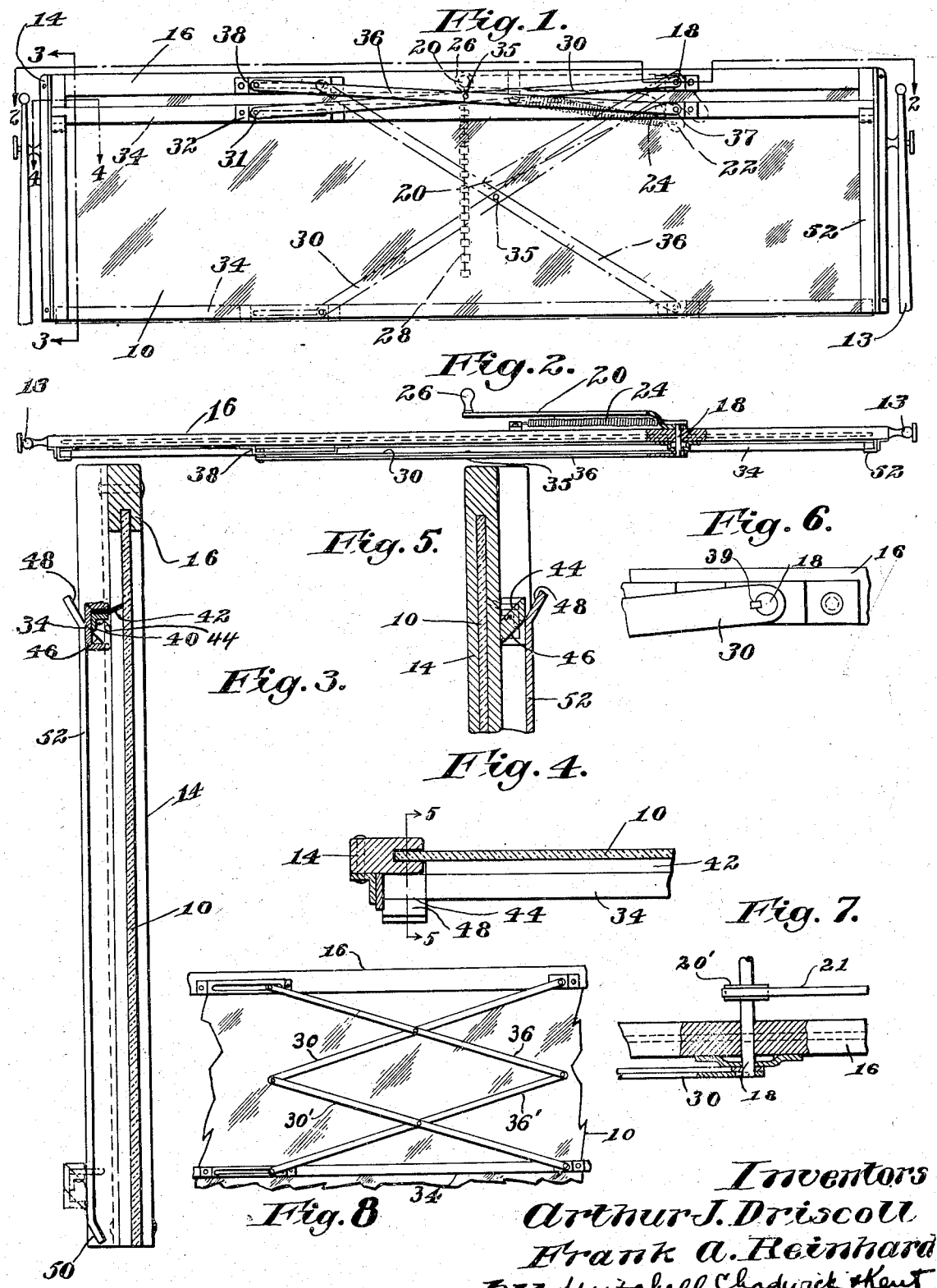

Patented Nov. 11, 1924.

1,515,015

UNITED STATES PATENT OFFICE.

ARTHUR J. DRISCOLL, OF JAMAICA PLAIN, AND FRANK A. REINHARD, OF READING, MASSACHUSETTS, ASSIGNORS TO UTILITY MANUFACTURING & SALES CORPORATION, OF BOSTON, MASSACHUSETTS, A CORPORATION OF MASSACHUSETTS.

WINDOW CLEANER.

Application filed June 1, 1921. Serial No. 474,134.

*To all whom it may concern:*

Be it known that we, ARTHUR J. DRISCOLL and FRANK A. REINHARD, citizens of the United States, residing, respectively, at Jamaica Plain and Reading, in the counties of Suffolk and Middlesex and State of Massachusetts, have invented certain new and useful Improvements in Window Cleaners, of which the following is a specification.

This invention relates to improvements in window cleaners. More especially it relates to devices for cleaning the windshield or other glass of a vehicle which is subject to the deposit of rain, snow, or other obscuring substance.

It is in general an object of the invention to provide means for rapidly and easily cleaning the windshield at the driver's pleasure. Further objects are to provide so that the cleaner can be carried in an out of the way place, so as not to interfere with the driver's vision and yet be ready to pass rapidly over the surface and quickly return. It is a further object of the present invention, to clean the entire glass area by one relatively short operating movement with automatic return; to sweep the glass in one direction only, and that a downward direction with the aid of gravity, thus guarding against its leaving a trail of water drops on the glass. Another object is to locate the operating handle so that the driver will not be obliged to move eyes or body from his driving position, and to that end to arrange it so that the device can be operated by him by hand or foot, or can be operated by another person in the car.

These objects are attained by providing linkage, normally compacted at the top of the windshield adapted to hold and to operate vertically a wiper extending horizontally along the surface to be cleaned, ready at its top to be moved downward over the entire height of the surface in one stroke, and restored to its ready position on the return stroke. Guides at the sides of the windshield are adapted to direct the wiper against the glass during the downward movement, and to hold it away from the glass during the movement upward. The wiper is suspended on pins at two points, one being fixed and pivotal, the other being sliding and pivotal; said pins being at the ends of crossed links or arms which can each swing down over the face of the glass. Similar pins attach the said arms to the frame at the top. The swing of the supporting pins is translated into a straight up and down movement of the wiper by reason of having the arms pivoted together where they cross each other, and by having their terminal pins at one end, say at the driver's left, strictly pivotal, while those at the other ends are connected to the frame and to the wiper through slots in said frame and wiper. At each end of the wiper a single vertical strip of metal with cam ends guides the wiper automatically against or away from the glass, according to its direction of motion. The said arms are swung down by power applied on the rear side of the glass, by an operating arm which can swing down on the same pivot as one of the wiper arms. For working this operating arm a handle may be employed, or a cord which can lead to a pedal or to any part of the car.

In the accompanying drawings, there is illustrated one embodiment of the invention which is adapted for cleaning one side of a windshield, which is ordinarily sufficient. This illustrates a device which could be constructed for cleaning both sides at the same time, however, and for cleaning other types of windows. The drawings and description are therefore to be taken as merely illustrative, and the scope of the invention is not limited to this particular application. It is intended that the patent shall cover, by suitable expression in the appended claims, whatever features of patentable novelty exist in the invention disclosed.

In the drawings:

Figure 1 is an elevation of the upper half of an automobile windshield as seen from the front, looking toward the interior of the car, and shows an embodiment of the invention attached thereto, its folded position being that shown in full lines, and its extended position being that shown dotted;

Figure 2 is a plan of the same, partly in section on line 2—2 of Figure 1;

Figure 3 is a side elevation in section on line 3—3 of Figure 1;

Figure 4 is a plan of a detail, in section on line 4—4 of Figure 1;

Figure 5 is a side elevation, in section on line 5—5 of Figure 4;

Figure 6 is a front elevation of a detail;

Figure 7 is a plan, partly in section, showing a modification of operating means; and Figure 8 is an elevation showing a modified form of linkage.

The drawings represent a windshield glass 10 carried in a frame mounted pivotally on uprights or supports 13 in the usual manner, there being vertical frame members 14 at the sides of the glass and a horizontal frame member 16 along the top edge thereof. On this top member 16 of the frame the device embodying the present invention is carried, there being a rotatable pin 18 passing through and journalled in the frame, at a point about one-quarter of its length from one end, to which pin is secured, on the driver's side of the frame, a bell crank lever having a relatively long arm 20, and a short arm 22. When this lever is in its normal inoperative position its long arm 20 is horizontal, substantially parallel to and overlying the face of the top frame member 16; and its short arm points down at approximately right angles thereto. The lever is yieldingly retained in this position by a tension spring 24, connected between the short arm 22 and the frame. The free end of the longer arm 20 is located within easy reach of the driver, and may have a handle 26, or may be connected by cord or chain 28 to a foot pedal or other contrivance, (not shown) by which the driver or other occupant of the car may pull down on the arm 20 to operate the device. On the front or outside of the frame an arm 30 is fixed at one end to the pin 18. This arm 30 is substantially parallel to the arm 20, and, when up, lies horizontally along the front face of the top windshield frame member. At its swinging end this arm has a pin 31 in sliding engagement with a horizontally slotted guide strip 32 which is attached to a horizontal movable wiper bar 34 extending the full width of the windshield. At its center 35, the arm 30 is pivotally connected to the center of a similar arm 36 of equal length but differently connected between the same frame 16 and bar 34. This stands in opposite relation to each of them, as compared with the arm 30, the cross arm 36 being pivotally connected to the bar wiper 34 by the pin 37 and slidably pivoted within a slotted guide strip 38 on the frame 16. The action of the linkage thus far described is as follows. When any person pulls down the arm 20, the arm 30 is swung down, both being fixed on the pin 18, as by a key 39, to the same angular extent. This movement of the arm 30 is transmitted through the pin 35 to the arm 36; and both transmit motion to the wiper bar 34, driving it downward and meanwhile holding it parallel to the frame top 16. Every point of the arm 30 moves in an arc of a circle whose center is the axis of the pin 18. Accordingly each point of this arm may be considered at any instant, considering its location by coordinates, to have moved a distance horizontally and a distance vertically; and the extent of its travel depends upon its radial distance from the pin 18. Therefore at every instant the center of the arm has moved downward just half as much as its end has done; and similarly the horizontal movement of its center is half that of its end. As the arm 36 is pivoted at its center to the center of the arm 30, it has the same vertical and horizontal movements as the center point of the arm 30. And since one end of the cross arm 36 is restrained from movement vertically, because of its engagement in the horizontal slot in the fixed guide strip 38, it follows that its other end must move vertically just twice as far as its center does, or in other words as far as the vertical movement of the free end of arm 30, both arms being of equal length. The bar 34, being connected to the moving end of each arm 30, 36, is thrust downward therewith remaining parallel to the top frame 16. In order that the motion of the bar may have no horizontal component, the guide strip 32 is slotted so that the end of the arm 30 may slide horizontally therein along the wiper as it moves down. The lower end of arm 36 moves only in a straight line and is pivotally connected to the wiper bar. This is accomplished by causing one end of the arm to move only horizontally in the slot of the guide strip 38, on a line running through the axes of the pin 18. Since its center 35 is always at a fixed distance from the fixed pin 18, it follows mathematically that its opposite end must always lie on a line through the pin 18 perpendicular to the horizontal line of movement of the first mentioned end. As illustrated the slots in the guide strips are long enough to permit movement of the wiper bar to just beyond the lower edge of the glass; by making them longer the permitted vertical throw of the bar could be increased to cover a second glass set lower in the windshield, or to extend further on the same glass, if larger.

The wiper shown is channel shaped in cross section, having a binding strip 40 adjustable within to hold a flexible wiper 42 in position to project from the bar toward the surface of the glass. At each end the bar is provided with cam surfaces 44 and 46, one of which is inclined downward from the outside top edge toward the inner edge and the other of which is inclined upward from the lower inner edge toward the outer edge. These cam surfaces are adapted to engage the inclined top and bottom end portions 48 and 50 of the side vertical guides 52. These are strips of metal set forward from the side frame members 14 and parallel thereto, except that their tops are inclined forward and their bottoms inclined backward. The distance of the vertical portion of the guide forward of the glass is predetermined so that when the cam-faced ends of the wiper bar pass downward between the strip and the frame, the wiper 42 will be pressed against the glass, and when the wiper bar passes up with its ends outside of the guide strip, the wiper will be held away from the glass. In order that the bar may always pass between the strip and the glass, when depressed, the arms 30 and 36 are made of metal having elasticity, and are given a permanent set tending to bring their lower ends inward against the glass. This slight spring pressure is sufficient to overcome the elastic resistance of the wiper so that it is bent a little along the glass. thereby allowing the bar to be held in the space between the vertical planes of the guide strips and of the glass. As it is moved downward from its position of rest above the ends of the side guides, the lower cam faces 46 descend upon the rear-facing inclines 48 at the tops of the side guides, which then force the bar close to the glass as it continues downward. The bar descends beyond the lower ends of the side guides, and is then free of the guide. The elasticity of the levers and the elasticity of the wiper are balanced when the bar ends are approximately in alignment with the vertical side guide strips. As the bar moves upward, when pulled on its return stroke by spring 24, the upper cam faces 44 of the wiper bar ends strike against the forward facing surfaces 50 of the bottoms of the side guide strips, thereby moving the bar outward, against the elastic bending of the arms 30, 36, so that it slides upward on the forward faces of the side guides, whereby the wiper is held away from the glass.

The device of the invention is thus seen to be simple in construction, assembly, and manipulation. A short downward movement of the operating lever sends the wiper twice as far in a direction which, being wholly downward, is superior to the sidewise or swinging movement of devices commonly known. Thus gravity is made to cooperate in the cleaning of the entire glass by one short stroke of the operator, giving vision through the entire area of the windshield, which is important for guarding against accidents. On its return the wiper leaves no drops, and accumulates none on its upper surface. Rubbing in one direction only the wear is less than with those wipers which are rubbed back and forth over the glass. The straight downward pull by which the operating lever can be worked is both convenient for the driver or occupant of the other front seat, and also permits of operation by a passenger in the rear seat, providing suitable cord and pulley connections are installed, it being necessary to apply the power in only one direction, the return being automatic.

Moreover the device can be operated continuously by power derived from any suitable source, air, electrical or mechanical in origin. To this end a pulley or gear 20' substituted on pin 18 for the operating lever 20, as shown in Figure 7, can receive reciprocating motion through a belt 21. Or, if preferred, the cord 28 on arm 20 can be pulled intermittently by power.

If the cleaning device of the present invention is to be used on an ordinary sized windshield, the linkage shown in Figure 1 is preferable, but if it is desired to extend the movement of the wiper over a greater extent of surface, this may be easily accomplished by adding cross arms 30', 36' to the first pair of arms 30, 36 as in Figure 8. In this case it is the extreme ends of such arms that are attached, respectively pivoted and slidably, to the wiper and the windshield frame. In such cases the word "arm" in the claims refers broadly to the complete arm, whatever be the number of sections jointed together that constitute it. Such an arrangement having one added section, is illustrated in Figure 8.

We claim:

1. A window cleaner having a wiper extending along one edge of the surface that is to be cleaned, combined with means for moving the wiper over the said surface, meanwhile maintaining its successive positions parallel; there being along each edge of said surface, parallel to the direction of motion of the wiper, a single guide having terminal inclines out and in; and there being on each end of the wiper, cam faces adapted to engage one pair of said inclines to turn the wiper against the surface, at an angle inclined thereto for good cleaning during its wiping stroke, and to engage the other pair of said inclines to turn the wiper away from the surface during its return stroke.

2. A window cleaner having a wiper extending along one edge of the surface that is to be cleaned, combined with linkage for moving the wiper over the said surface, meanwhile maintaining its successive positions parallel; there being along each edge of said surface parallel to the direction of motion of the wiper, a single guide strip adapted to hold the wiper against said surface on its wiping stroke and away therefrom on its return stroke; the said linkage being elastic laterally, to and from the surface, and set to center the ends of the wiper in the plane of the guide strips.

3. A window cleaner having a wiper extending along one edge of the surface that is to be cleaned, combined with operating means pivoted at said edge and linkage connecting said operating means with the wiper and translating the rocking motion thereof into rectilinear motion of the wiper over said surface; the said linkage comprising a pair of arms centrally pivoted together, each being at one end pivotally and at its other end slidably connected between the wiper and the thing which is to be cleaned.

4. A window cleaner having a wiper extending along one edge of the surface that is to be cleaned; an operating arm on the opposite side of said surface carried on a pin journaled in the frame of the window at said edge; there being linkage connecting the pin and the wiper comprising a pair of arms pivoted together intermediate their ends, one arm being connected at one end to the pin, and at its other end slidably engaged in a guide slot on the wiper; the other arm being pivoted at one end to the wiper and at its other end engaged in a guide slot on the frame; the said guide slots being perpendicular to the direction of travel of the wiper.

5. A window cleaner having a wiper extending horizontally along one edge of the surface that is to be cleaned, combined with operating means pivoted above the wiper at said edge and linkage connecting said operating means with the wiper and translating the rocking motion thereof into rectilinear vertical motion of the wiper over said surface; the said linkage comprising a pair of arms pivoted together centrally and each being at one end pivotally and at its other end slidably connected between the wiper and the thing which is to be cleaned; the said slidable connection being pins on the arms slidable in horizontal slots, wherein the slide bearing is horizontal during the vertical movement of the wiper.

Signed at Boston, Massachusetts, this 25th day of May, 1921.

ARTHUR J. DRISCOLL.
FRANK A. REINHARD.